(12) United States Patent
Mofakhami

(10) Patent No.: US 8,507,147 B2
(45) Date of Patent: Aug. 13, 2013

(54) PROTON EXCHANGE MEMBRANE AND CELL COMPRISING SUCH A MEMBRANE

(75) Inventor: Arash Mofakhami, Buthiers (FR)

(73) Assignee: Ceram Hyd, Avon (FR)

( * ) Notice: Subject to any disclaimer, the term of this patent is extended or adjusted under 35 U.S.C. 154(b) by 434 days.

(21) Appl. No.: 12/602,135

(22) PCT Filed: Mar. 6, 2008

(86) PCT No.: PCT/FR2008/050380
§ 371 (c)(1), (2), (4) Date: Jun. 1, 2010

(87) PCT Pub. No.: WO2008/148956
PCT Pub. Date: Dec. 11, 2008

(65) Prior Publication Data
US 2010/0279201 A1    Nov. 4, 2010

(30) Foreign Application Priority Data
May 28, 2007  (FR) ...................................... 07 55287

(51) Int. Cl.
*C04B 35/583*   (2006.01)
*C01B 3/00*   (2006.01)

(52) U.S. Cl.
USPC ........................................................ 429/492

(58) Field of Classification Search
CPC ............................ C01B 3/0031; C04B 35/583
USPC ...................................................... 429/492
See application file for complete search history.

(56) References Cited

U.S. PATENT DOCUMENTS

| 4,146,446 A | 3/1979 | Von Sturm |
| 4,737,249 A | 4/1988 | Shepard, Jr. et al. |
| 4,795,617 A | 1/1989 | O'Hare |
| 5,205,911 A | 4/1993 | Kawolics et al. |
| 5,270,126 A | 12/1993 | Aoki |
| 5,935,727 A | 8/1999 | Chiao |
| 6,306,358 B1 | 10/2001 | Yamamoto |
| 6,864,011 B2 | 3/2005 | Kawahara et al. |
| 2002/0100682 A1 | 8/2002 | Kelley et al. |
| 2004/0140201 A1 | 7/2004 | Horikawa |
| 2005/0016866 A1 | 1/2005 | Kramer et al. |
| 2005/0072334 A1 | 4/2005 | Czubarow et al. |
| 2006/0194096 A1 | 8/2006 | Valle et al. |
| 2006/0237688 A1 | 10/2006 | Zimmermann |
| 2007/0119718 A1 | 5/2007 | Gibson et al. |
| 2007/0178384 A1 | 8/2007 | Kajita et al. |
| 2008/0160359 A1 | 7/2008 | Mofakhami |

(Continued)

FOREIGN PATENT DOCUMENTS

| EP | 1 400 986 A1 | 3/2004 |
| FR | 2 871 478 A1 | 12/2005 |

(Continued)

OTHER PUBLICATIONS

Written Opinion of the International Search Authority for International Patent Application No. PCT/FR2009/050352.

(Continued)

*Primary Examiner* — Yogendra Gupta
*Assistant Examiner* — Alison Hindenlang
(74) *Attorney, Agent, or Firm* — O'Brien Jones, PLLC

(57) ABSTRACT

A cell of a fuel cell comprises an anode, a cathode, and between the cathode and the anode, a layer of ceramic including activated boron nitride.

24 Claims, 1 Drawing Sheet

(56) References Cited

U.S. PATENT DOCUMENTS

| | | |
|---|---|---|
| 2010/0089767 A1 | 4/2010 | Mofakhami |
| 2010/0280138 A1 | 11/2010 | Mofakhami |
| 2011/0091789 A1 | 4/2011 | Mofakhami et al. |

FOREIGN PATENT DOCUMENTS

| | | |
|---|---|---|
| FR | 2 916 906 A1 | 12/2008 |
| WO | 96/07623 A1 | 3/1996 |
| WO | 00/45457 A2 | 8/2000 |
| WO | 02/41432 A1 | 5/2002 |
| WO | 03/062152 A1 | 7/2003 |
| WO | WO 2004/067611 A1 | 8/2004 |
| WO | WO 2005/005691 A1 | 1/2005 |
| WO | 2006/003328 A1 | 1/2006 |
| WO | WO 2008/129182 A2 | 10/2008 |
| WO | 2008/148957 A1 | 12/2008 |
| WO | WO 2009/115732 A1 | 9/2009 |

OTHER PUBLICATIONS

Kojima, Y., et al., "Hydrogen storage of metal nitrides by a mechanochemical reaction," Journal of Power Sources, 159, (2006), pp. 81-87.
International Search Report in PCT/FR2008/050381 having a mailing date of Sep. 12, 2008.
Written Opinion of the International Searching Authority in PCT/FR2008/050381.
International Search Report in PCT/FR2008/050380 having a mailing date of Sep. 11, 2008.
Written Opinion of the International Searching Authority in PCT/FR2008/050380.
International Search Report for International Patent Application No. PCT/FR2008/050379 dated Jan. 22, 2009.
Written Opinion of the International Search Authority for International Patent Application No. PCT/FR2008/050379 dated Jan. 22, 2009.
International Search Report for International Patent Application No. PCT/FR2009/050352 dated Aug. 26, 2009.
Written Opinion of the International Search Authority for International Patent Application No. PCT/FR2009/050352 dated Aug. 26, 2009.
Office Action dated May 3, 2012 from U.S. Appl. No. 12/529,292.
Office Action dated Oct. 3, 2012 from U.S. Appl. No. 12/529,292.
Response to Office Action dated May 3, 2012 from U.S. Appl. No. 12/529,292.
Office Action dated Mar. 15, 2012 from U.S. Appl. No. 12/602,116.
Response to Office Action dated Mar. 15, 2012 from U.S. Appl. No. 12/602,116.
Notice of Allowance dated Oct. 30, 2012 from U.S. Appl. No. 12/602,116.
Supplemental Notice of Allowance dated Nov. 16, 2012 from U.S. Appl. No. 12/602,116.
Office Action dated Dec. 9, 2011 from U.S. Appl. No. 12/920,588.
Office Action dated Sep. 14, 2012 from U.S. Appl. No. 12/920,588.
Response to Office Action dated Dec. 9, 2011 from U.S. Appl. No. 12/920,588.

PROTON EXCHANGE MEMBRANE AND CELL COMPRISING SUCH A MEMBRANE

This is a national stage application of PCT/FR2008/050380, filed internationally on Mar. 6, 2008, which claims priority to French Application No. FR 07 55287, filed in France on May 28, 2007.

The present invention relates to proton exchange membranes and more particularly but not exclusively, to those used in fuel cells.

WO 2006/003328 discloses the use of boron nitride ceramic for achieving collision between $H^+$ and $e^-$ and storing hydrogen.

Patent application US 2004/0140201 recalls that the use of a perfluorosulfonic resin is known such as the one marketed by DUPONT DE NEMOURS under the brand of <<NAFION®>> as a proton exchange membrane in fuel cells. Such a resin has certain drawbacks, notably limited temperature operability as well as the requirement of presence of water. This prior application suggests a remedy for these drawbacks by using fullerene molecules.

Publications U.S. Pat. No. 6,864,011, EP 1 400 986, WO 02/41432 describe other arrangements of proton exchange membranes for fuel cells.

U.S. Pat. No. 5,270,126 describes a membrane including boron nitride powder bound with a fluorinated resin impregnated with phosphoric acid. The latter participates in proton exchange.

The invention notably aims at proposing a novel proton exchange membrane which is capable of operating at a relatively high temperature such as at room temperature, without requiring humidification of the fuel or of the oxidizer.

According to one aspect of the invention, the fuel cell, the electrolyzer or accumulator includes:
  an anode,
  a cathode,
  between the cathode and the anode, a layer of a material including activated boron nitride, for example a ceramic.

Preferably, this is a layer of hexagonal boron nitride. The layer may include powdery boron nitride contained in a polymeric matrix.

Such a cell has the advantage of being able to operate at various temperatures without having certain drawbacks of <<NAFION®>> resins as recalled above. The material is preferably impervious to hydrogen. This imperviousness to hydrogen is for example obtained by using a non-porous material, i.e. the porosity of which is non-detectable with conventional apparatuses for measuring porosity, such as the mercury porosity meter. Use may further be made of a material having a relatively high surface porosity, so as to increase the exchange surface area but not with totally communicating internal porosity, so as to form a barrier to the crossing of the membrane by hydrogen.

The cathode may include at least one layer of a metal compound in contact with the boron nitride layer.

The anode may include at least one layer of a metal compound in contact with the boron nitride layer.

One or both of the electrodes, anode and/or cathode, may include at least one of the compounds from the following list, which is not limiting: platinum, for example as nanograins, boron nitride, notably activated boron nitride as mentioned below, active coal, a binder, for example ethanol or a polymeric compound, for example PVA or PTFE, or further a mixture of these components.

The anode may for example include a thin layer of a mixture of $RuO_2$, $IrO_2$ or $RuO_2$, $IrO_2$ and $TiO_2$ or $RuO_2$, $IrO_2$ and $SnO_2$ lined with a plate of porous titanium (from 30% to 50% for example). The thin layer may have a thickness comprised between 5 μm and 20 μm, for example about 10 μm.

Either one of the electrodes may be made in a powdery form, being sprayed on the membrane formed by the boron nitride layer mentioned above. After spraying, this layer may be compressed under a press at a pressure comprised between 5 and 40 kg/m², for example about 20 kg/m², at a temperature comprised between 15° C. and 200° C., for example between 25° C. to 150° C., in order to improve adhesion of the electrodes to the membrane. The temperature depends on the nature of the layer, for example depending on whether it either includes or not a polymer sensitive to the maximum applied temperature.

The thickness of the boron nitride layer may be less than or equal to 2,500 μm, better 1,000 μm, still better 500 μm, preferably 250 μm, better 150 μm, for example between 80 and 120 μm.

The cell may include a substrate for supporting the membrane. This substrate may contribute to mechanical strength of the cell and allow the use of a relatively thin membrane.

The substrate may for example be selected from: porous alumina, zirconia, and boron nitride and mixtures thereof.

The substrate may for example include a fine woven fabric, for example made in Nylon®, polyethyletherketone, ethylene tetrafluorethylene, polyethylene terephthalate or polyester.

The material of the substrate may be inert towards the electrochemical reactions taking place in the cell.

The substrate is pervious to chemical species which should attain the membrane, this perviousness being advantageously intrinsic to the material used.

The object of the invention according to another of its aspects, is further a fuel cell including a cell as defined above, as well as a fuel feeding circuit on the side of the cathode and an oxidizer feeding circuit on the side of the anode.

The fuel may be hydrogen gas or other gases or liquids.

The oxidizer may be air or oxygen.

The fuel cell may include a material in which the hydrogen intended for feeding the cell is stored as a hydride. This material is for example selected from intermetallic compounds, notably from complex metal or interstitial hydrides, for example selected from the following list: of the $AB_5$ type (A and B being metals), for example $LaNi_5$, laves phases (Zr, Ti) (Mn, V, Cr, Ni)$_2$, for example $ZrMn_2$ or $TiMn_2$, Mg, TiFe, $Mg_2Ni$, centered cubic solid solutions based on vanadium, $BaReH_9$ (the formula corresponding to the hydride state), $Mg_2FeH_6$ (the formula corresponding to the hydride state), $NaAlH_4$ (the formula corresponding to the hydride state), $LiBH_4$ (the formula corresponding to the hydride state), and all their compounds, derivatives or their alloys.

The material layer may include a ceramic, for example including hexagonal boron nitride, preferably activated by an acid solution under an electric field, lithium nitride, Nafion® (Dupont de Nemours), boric acid, an ion conducting polymer, for example PVA. It may be selected from ion exchange ceramics developed for PEMFC or PCFC fuel cells.

The material layer may for example include turbostratic boron nitride, i.e. the crystallization planes of which may be slightly shifted relatively to the theoretical crystallization position, for example the hexagonal crystallization of boron nitride, which leads to planes between them not being so well maintained, the latter being more spaced apart.

The material layer may include hexagonal boron nitride grains placed next to each other, for example grains with a median size larger than 1 nm, or even larger than 10 nm, or even larger than 5 μm, and less than 20 μm, or even of the order of 10 μm. The grains may themselves consist of crystallites of average size comprised between 0.1 and 0.5 μm.

The boron nitride grains may preferably be oriented not all parallel to the layer, but for example perpendicularly to the latter, so as to ensure better mechanical strength, or even heterogeneously in order to ensure better proton conduction.

The material layer may include percolated boron nitride grains, for example maintained firmly attached to each other by a compound, for example a compound from the following list: nickel, boron oxide, calcium borate, ethylcellulose, boric acid, polyvinyl alcohol, vinyl caprolactam, PTFE (Teflon®), sulfonated polyethylsulfone.

The material layer may be formed by boron nitride inserted into a binder, for example boric acid or a polymeric membrane, which may provide very good proton conductivity to the ceramic layer. The polymer may for example be PVA (polyvinyl alcohol), vinyl caprolactam, PTFE (Teflon®), sulfonated polyethersulfone.

Boron nitride may appear as grains, for example with an average size of the order of 7-11 µm. The mass proportion of boron nitride in the material may be comprised between 5% and 100%, for example up to 70%. The layer may entirely be made of high pressure sintered boron nitride powder. Alternatively, it may include boron nitride and a binder, being made by an HIP (Hot Isostatic Pressure) process.

The polymer, for example PVA, may be used for blocking the present porosities in boron nitride. Adding the polymer may for example be carried out in vacuo, so that the latter is sucked into the porosities of the boron nitride.

The material layer may notably include one or more of the compounds of the following list, which is non-limiting: an inorganic compound, for example silica, for example as Aerosil®, pyrogenated amorphous silica, organic silica with a thiol group, silica with a phosphonic acid function, silica with sulfonic acid anchored at the surface, alumina, zirconia, sulfated zirconia, titanium oxide, sulfonated titanium oxide, tungsten trioxide, tungsten trioxide hydrate, heteropolyacid, for example polytriacetylene (PMA), polymethacrylic acid (PTA), STA, SMA, tungstophosphoric acid (TMA), molybdophosphoric acid (MBA), disodium tungstophosphoric acid salt (NA-TPA), phosphomolybdic acid (PMA), lacunar heteropolyacid $H_8SiW_{11}O_{39}$, functionalized sulfonic heteropolyacid, PWA, silico-tungstic acid, PTA supported on $SiO_2$, $ZrO_2$ and $TiO_2$, MCM-41-loaded heteropolyacid, mesoporous tungsten silicate material SI-MCM-41, Y-zeolite-loaded heteropolyacid, silico-tungstic acid, zirconium phosphate, zirconium sulfophenyl phosphate (ZRSPP), hydrogenated zirconium phosphate $Zr(HPO_4)_2$, zirconium tricarboxybutyl phosphonate, zirconium sulfophenylene phosphonate $Zr(HPO_4)_{10}$ $(O_3PC_6H_4SO_3H)_{10}$, zirconium phosphate sulfophenylene phosphonate, sulfonated zirconium phosphate, cesium salt of silico-tungstic acid, multilayer silicate nanoparticles, for example montmorillonite, laponite, modified montmorillonite, for example sulfonated montmorillonite, MCM-41, organic montmorillonite (OMMT), montmorillonite grafted with organic sultones and perfluorinated sultones, phosphosilicates ($P_2O_5$—$SiO_2$), phosphato-antimonic acid, noble metals, for example platinum, ruthenium, platinum silicate coated with Nafion®, silver, zeolite, chabasite and clinoptylolite, mordonite, phosphate, calcium phosphate, calcium hydroxyphosphate, boron phosphate, organic compound, polymer, Nafion®, perfluorosulfonic acid, sulfonated polysulfone, PEO, PTFE, polyaniline, poly(vinylidene)fluoride-chlorotetrafluoroethylene, PEG, DBSA, 4-dodecylbenzene sulfonic acid, SEBSS (sulfonated styrene, sulfonated styrene-(ethylene-butylene)), PVA, glutaraldehyde, krytox, diphenylsilicate, diphenyldimethoxysilicate, sulfonated poly(ethersulfone), PVDF, Nafion® NRE-212 membrane, $Cs_{2.5}H_{0.5}PWO_{40}$, PVDF-G-PSSA, polyvinylidene fluoride, polyacrylonitrile, dodecatungstophosphoric acid, sulfonated (poly)etheretherketone (SPEEK), PVA, PEO, sulfonated poly(arylene-ethersulfone), polyvinyl alcohol, PEEK (s-polyetheretherketone), sulfonated polyethersulfone cardo, polyphenylene oxide (PPO), polyethylene glycol, silica nanoparticles, divacant tungstosilicate $[\gamma-SiW_{10}O_{36}]^{8-}$, PWA, PBI, PEG, polyethylenimine (PEI), disulfonated poly(arylene-ethersulfone), Teflon®, sulfonated divinylbenzene (crosslinked DVB), poly(ethylene-alt-tetrafluroroethylene) grafted with polystyrene, poly(vinyl difluoride), polybenzimide azole, PVDF, sulfonated poly (etheretherketone) cardo, poly(fluorinated arylene-ether)s, Nafion® 115, polyimide, polyamidimide (PAI), polyvinylidene fluoride (PVDF), styrene-ethylene-butylene-styrene elastomer (SEVS), poly (sulfonated biphenylethersulfone), polytetrafluoroethylene (PTFE), PBI.

The boron nitride layer may be obtained by the following method.

Boron nitride gains are mixed with a polymeric binder in liquid form, this mixture being poured on a substrate and then heated to a sufficient temperature so as to cause calcination of the binder, for example to a temperature of the order of 600 or 700° C., so that the boron nitride grains are percolated through each other on the substrate.

In an additional step, the obtained result is heated to a temperature comprised between 800 and 1,700° C., or even between 1,000 and 1,500° C. under a neutral atmosphere, for example of nitrogen or argon, causing sintering of the grains with each other.

Finally, in an additional step, the substrate is removed and a rigid boron nitride membrane consisting of sintered grains is obtained.

In the foregoing, the boron nitride may have been activated beforehand or activated during or at the end of the process for making the ceramic layer.

By activation of boron nitride is meant a method with which proton conduction may be promoted in boron nitride.

The boron nitride may for example be activated in an acid solution while being subject to an electric field.

The boron nitride may further be activated in a soda solution, with or without applying an electric field.

In another further method, the boron nitride may be activated by being quenched in a solution, for example of water, in the presence or iron, for example an iron grid, and under application of an electric field.

The use of boron nitride in a powdery from may facilitate activation of the latter.

The boron nitride may be activated in its powdery form before inserting it in a binder, for example in a polymer, or further after inserting it in a binder, for example depending on the binder used.

In the method described above, the boron nitride grains may be activated before their insertion into the polymeric binder or after sintering of the grains.

In the case of sintering, activation may be carried out at the end of the method, in order to avoid the risk of its being destroyed by sintering.

The object of the invention according to another of its aspects is further a method for making a cell as defined above, including the following step:
   activating a layer of a material for example a ceramic, including boron nitride by exposing the latter to an acid.
In an additional step:
   a layer of electrode catalyst may be deposited on at least one face of the boron nitride layer.

The catalyst may be a layer of at least one metal compound, for example platinum, nickel, or platinum-graphite, or nickel-graphite.

The boron nitride layer may be metallized before activation.

The activation may occur in the presence of an electric field.

The object of the invention according to another of its aspects is further a method for making such a membrane for fuel cell or other applications, notably an electrolyzer or accumulator, in which the membrane is exposed to an acid solution and then rinsed.

Exposure of the membrane to the acid may advantageously be carried out under an electric field, which may improve efficiency of the activation. The electric field may for example be comprised between 15 and 40,000 V/m, or even be of at least 25 V/m, or even of the order of 15,000 V/m. A field of 15,000 V/m is equivalent to applying 1.5 V for a membrane thickness of 100 μm or further 15 V for a thickness of 1 mm.

The object of the invention is further a method for activating a membrane as defined earlier, including the following step: exposing boron nitride to a solution with which hydroxyl radicals —OH may be provided and B—OH bonds may be created in boron hydride, or else $H_3O^+$ ions may be provided with which $NH_2$ bonds and B—OH bonds may be created in boron nitride.

The object of the invention according to another of its aspects, is further a proton exchange membrane for an electrochemical device, notably a fuel cell, an electrolyzer or an accumulator, including a layer of a material, for example a ceramic, of activated hexagonal boron nitride.

The invention may be better understood upon reading the detailed description which follows of non-limiting exemplary embodiments thereof, and upon examining the appended drawing, wherein.

Figure 1:
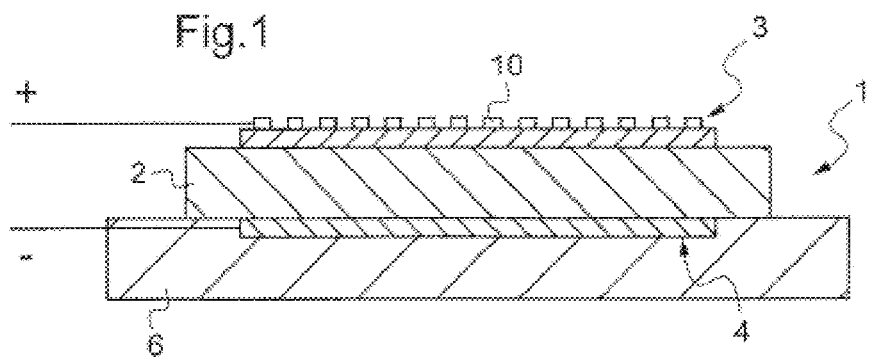
FIG. 1 is a schematic view of a fuel cell made according to the invention.

In the drawing, the relative proportions of the various components are not always observed, for the sake of clarity.

A fuel cell 1 is illustrated in FIG. 1 including a proton exchange membrane 2 formed with an activated hexagonal boron nitride (h-BN) ceramic.

Cell 1 includes an anode 3 on the side of the proton exchange membrane 2 and a cathode 4 on the other side of the latter.

The anode for example includes a layer used for the oxidization reaction, of a metal compound such as platinum or gold, or a composite such as platinum-graphite or nickel-graphite, and the cathode a layer of catalyst for the fuel, for example a layer of platinum, nickel, nickel-graphite or platinum-graphite, each layer being able to be in contact with the membrane 2.

The proton exchange membrane 2 as well as the two layers positioned on either side of the latter may be supported by a porous and inert substrate 6, such as for example a porous layer of alumina, zirconia or boron nitride.

Electric conductors may contact the anode and the cathode.

The anode 3 may for example include on the layer used for the oxidization reaction, a layer of gold, for example as a screen 10 in order to gather electric current.

The thickness of the exchange membrane 2 is for example 100 μm and that of the layers used for the oxidization and catalyst reaction for example ranges from 10 to 30 μm.

In an exemplary embodiment of the invention, the proton exchange membrane 2 is made from an h-BN boron nitride ceramic of reference HIP from SAINT-GOBAIN, activated by exposure to an acid, for example sulfuric acid, for example for several hours with sulfuric acid, for example at a concentration of 0.1M to 5M, for example 5M. During this exposure, the membrane may, if necessary, be exposed to an electric field of about 30,000 V/m, i.e. to a voltage of 30 V when the thickness of the membrane is 1 μm, which may improve the quality of the activation. The ceramic is rinsed after exposure to the acid. Without being bound by a theory, with the activation it is possible to modify the pending bonds of the grains of the boron nitride.

When the membrane is activated in the presence of an electric field, this electric field may be generated between two electrodes. The anode may either be in contact with the membrane or not and is in contact with the acid and water electrolyte. The cathode should be only in contact with the membrane and not in contact with the acid.

These may be electrodes which are only used for the activation process and not useful subsequently, which for example are not found again in the system using the membrane. These may also be electrodes, at least one of which is again found in the final system.

At least one of the electrodes used for the activation or even both of them, may be in contact with the membrane and be for example permanently attached to the latter. One of the electrodes used for activation is for example a platinum anode, other electric conductive components may be used, subject to that they do not oxidize or degrade rapidly.

The anode may further be in porous platinum if the latter is in contact with the membrane. The other electrode also porous is a cathode in any electrically conducting material. These electrodes may be flattened, for example by thin layer deposition methods against the membrane.

In an alternative, electrically conducting layers, for example layers of porous platinum, are deposited on either side of the boron nitride layer. The thereby coated membrane is then exposed to the acid in order to activate it, in the presence of an applied electric field by means of the conductive layers.

Once the exposure to the acid is performed, the membrane may be rinsed and dried.

Of course, there is no departure from the scope of the present invention by providing modifications to the examples which have just been given above.

The exchange membrane may notably only be coated with platinum, nickel or an alloy of both of these metals on the anode. The other face corresponding to the cathode is for example made conductive by depositing a metal such as a copper or silver lacquer.

The proton exchange membrane may have various shapes, for example a planar or cylindrical shape.

Figure 2:
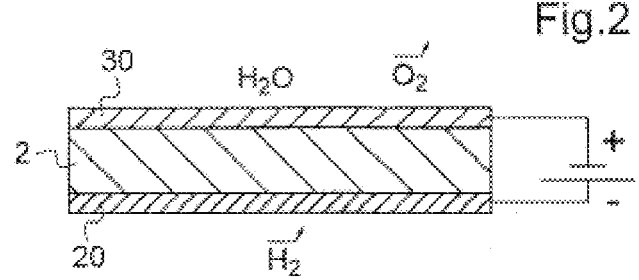
FIG. 2 is a schematic view of a proton exchange membrane in order to produce an electrolyzer membrane.

In the example of FIG. 2, the proton exchange membrane 2 is used within an electrolyzer including a metal cathode 20, for example in platinum, or other electrical conductors, the anode 30 being for example also in platinum.

Figure 3:
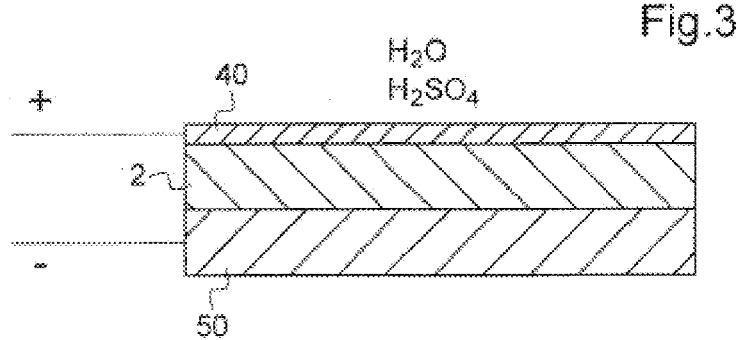
FIG. 3 is a schematic view of a proton exchange membrane in order to produce an accumulator.

In the example of FIG. 3, the exchange membrane 2 is used within an accumulator, the anode 40 for example being made in platinum or nickel and in contact with an aqueous acid electrolyte, for example a solution of sulphuric acid, while the cathode 50 includes a hydridable material.

The expression <<including one>> should be understood as being a synonym of <<including at least one>>.

The invention claimed is:

1. A fuel cell, electrolyzer or accumulator, comprising:
an anode;

a cathode; and between the cathode and the anode, a proton exchange membrane comprising a layer of a material including activated boron nitride, wherein the layer comprises powdery boron nitride contained in a polymeric matrix.

2. The fuel cell according to claim 1, wherein the material is impervious to hydrogen.

3. The fuel cell according to claim 1, wherein the material is non-porous.

4. The fuel cell according to claim 1, wherein the material has non-zero surface porosity.

5. The fuel cell according to claim 1, wherein the cathode comprises at least one layer of a metal compound in contact with the boron nitride layer.

6. The fuel cell according to claim 1, wherein the anode comprises at least one layer of a metal compound in contact with the boron nitride layer.

7. The fuel cell according to claim 5, wherein the metal compound is selected from: platinum, gold, nickel and their alloys.

8. The fuel cell according to claim 1, wherein the thickness of the boron nitride layer is less than or equal to 2500 µm.

9. The fuel cell according to claim 8, wherein the thickness of the layer is less than or equal to 250 µm.

10. The fuel cell according to claim 1, further comprising a substrate for supporting the membrane.

11. The fuel cell according to claim 10, wherein the substrate comprises a material selected from: alumina, zirconia, porous boron nitride and mixtures thereof.

12. The fuel cell according to claim 1, further comprising:
a fuel feeding circuit on the side of the cathode; and
an oxidizer feeding circuit on the side of the anode.

13. The fuel cell according to claim 12, wherein the fuel is hydrogen gas.

14. The fuel cell according to claim 12, wherein the oxidizer is air or oxygen.

15. The fuel cell according to claim 12, further comprising a material in which the hydrogen intended to feed the cell is stored as a hydride.

16. An electrolyzer comprising the cell of claim 1.

17. A method for making the cell of claim 1, comprising:
activating a layer of material comprising boron nitride by exposing the layer to an acid.

18. The method according to claim 17, further comprising:
depositing a layer of an electrode catalyst on at least one face of the boron nitride layer.

19. The method according to claim 17, wherein the catalyst is a layer of at least one metal compound.

20. The method according to claim 19, wherein the boron nitride layer is metallized before activation.

21. The method according to claim 17, wherein the activation occurs in the presence of an electric field.

22. A method for making the membrane of the fuel cell of claim 1, comprising:
exposing the membrane to an acid solution; and
rinsing the membrane after the exposing.

23. The method according to claim 22, wherein the exposing of the membrane to the acid is performed under an electric field of at least 25 V/m.

24. A method for activating the membrane of the fuel cell of claim 1, comprising:
exposing the boron nitride to a solution with which hydroxyl radicals —OH are capable of being provided and B—OH bonds are capable of being created in the boron nitride.

* * * * *